April 24, 1928.

H. G. DORSEY 1,667,540

METHOD AND APPARATUS FOR MEASURING DISTANCE

Filed Dec. 22, 1923

Inventor:
Herbert Grove Dorsey
per
Ezekiel Wolf.
Attorney.

April 24, 1928.

H. G. DORSEY 1,667,540

METHOD AND APPARATUS FOR MEASURING DISTANCE

Filed Dec. 22, 1923   2 Sheets-Sheet 2

Inventor:
Herbert Grove Dorsey
per
Ezekiel Wolf
Attorney.

Patented Apr. 24, 1928.

1,667,540

UNITED STATES PATENT OFFICE.

HERBERT GROVE DORSEY, OF GLOUCESTER, MASSACHUSETTS, ASSIGNOR TO SUBMARINE SIGNAL CORPORATION, OF BOSTON, MASSACHUSETTS, A CORPORATION OF DELAWARE.

METHOD AND APPARATUS FOR MEASURING DISTANCE.

Application filed December 22, 1923. Serial No. 682,243.

The invention relates to the measurement of time intervals wherein the interval to be measured is between the happening of two successive events which operate the time measuring means to produce an indication of the interval to be measured. In a narrower application of the principle the time measuring element comprises means in which the indication is noted at some place on a moving surface or a rotating disc in such a manner that the particular position at which the indication or signal occurs denotes a definite time interval. Or, by another modification the space between a definite point, the zero point, and the place at which the signal occurs, or the space between two occurrences of the signal, may be the measure of the interval of time to be measured. The application of this method of measuring time which is useful, especially in measuring very short times of the order of hundredths of a second, as well as slightly longer intervals, has an exceedingly useful application to determine the distance of some reflecting surface or the distance of some object having responsive means to respond and relay the signal back to the origin of its transmission. Under such an application of principle as above outlined, a ship provided with the proper apparatus could find the distance of an iceberg, a rocky coast, another ship, or any large object in its vicinity. The apparatus can also be adapted to depth sounding, to the determination of the depth of water below a ship's bottom, and thus serve useful purposes in navigation.

The purpose of my invention is, therefore, to measure intervals of time of short duration, especially over a range from a fraction of a second to a number of seconds.

It is also the purpose of this invention to provide visual means to indicate this time interval either in the distance traveled and returned of an energy impulse, such as a sound compressional wave, in the actual units of the time interval, or in some units proportional to the desired interval of time or distance which is to be measured.

It is a further purpose of my invention to provide visual means to indicate the depth of water beneath a ship by measuring the elapsed time required for a compressional impulse to travel from the ship to the bottom of the water and return by reflection or otherwise.

There is akin to the above mentioned purpose the additional purpose of measuring the distance of any different sound transmitting medium capable of refraction or reflection of energy impulses in the neighborhood of the transmitting medium where the source of energy is located, such as, for instance, of a body of water of different temperature, degree of salinity, an iceberg, a ship, a rock or coast shelving.

It is also the purpose of this invention to provide a rotating or moving surface such as a disc or endless band having mounted thereon an indicating mechanism capable of indicating the happening of the events desired in the measurement of the time interval, the depth of water beneath a ship or the like, which indicating mechanism gives its signal or indication, so sharply in point of time, that the position of the event in point of space as the disc or band moves is substantially the width of an ordinary pencil line.

Associated with the above method of indicating the signal sharply, there is provided a visible means whose purpose is to give a maximum intensity of luminosity such that, although the signal is given for only a very short duration, its indication is clearly visible to the human eye.

In the method of measuring the depth of water beneath ships, commonly known as soundings, difficulty has been experienced not only in creating a short impulse such that the effect of the impulse is entirely over before the echo of the reflected wave returns but also in the method of controlling the receiving or detecting mechanism such that it is ready and capable of responding to the returning echo reflected from the bottom even though, on account of the great velocity of compressional waves in water, the echo follows very closely after the sound has been emitted. The common phenomenon of sound transmission in water, known to the experimenter as "trailing" is one of the difficulties which practically all the methods of soundings by echo has to overcome. In the ordinary meaning "trailing" is the gradual dying down of the sound source which lingers after the impulse of the first energy has been imparted to the water. In the present method this is overcome by creating a very short impulse in a highly damped transmitter, or by methods of sound screening and by a further provision which may cause the indicating mechanism to be inoperative at the time the impulse is created. As the description of the apparatus and method used will show, for the purpose of operating the indicating mechanism, without a time lag, all the circuits, as well as the relay which may be employed, operate simultaneously with the impulse received, such that the indicating signal operates immediately upon the return of the impulse.

Other purposes and aims of my invention will be indicated and understood from the following description and the drawing, in which:

Figure 1ª represents a modification of the amplifying circuit.

Figure 1:
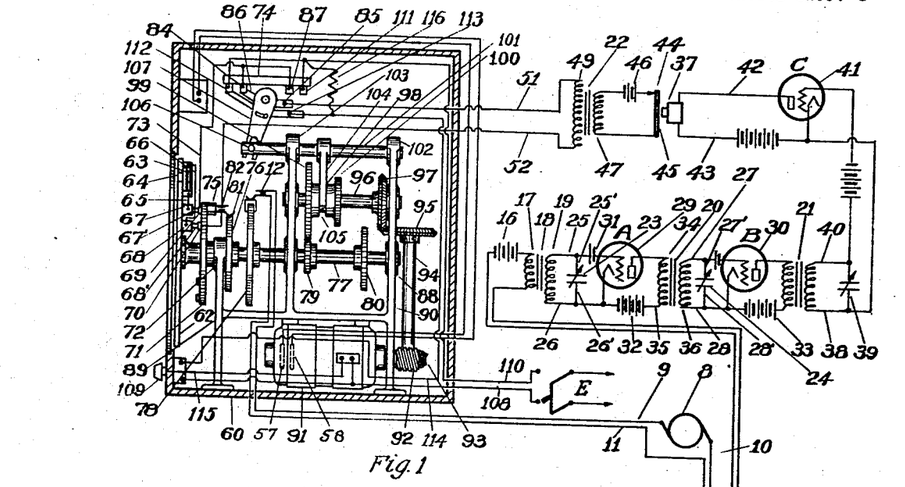
Figure 1 represents a part diagrammatical and part actual arrangement of the circuits and apparatus as applied to the method of depth sounding.

In the diagrammatic representation of Figure 1, there is shown a section of a vessel at 1, immersed in the sound transmitting mechanism 2, and a bottom or reflecting medium 3. Within the vessel 1 is a sound source 4 such as an oscillator commonly used in submarine signaling work or any form of sound emitter which is shown as situated in a water tank 5 so that the loss of energy transmission to the outside water will be as slight as possible. Any other form of mounting or installation of the sound transmitter may be used such as an installation of a sound source fixed rigidly upon the outside of a vessel, as, for instance, a structure fixed rigidly to the keel of the vessel or an overboard structure suspended from a davit upon the boat. As a matter of illustration the sound source is shown as inside the vessel in the tank 5 while the sound receiving source such as a microphone 15 or the like is shown in another tank 6 shielded from the direct sound of the emitting source 4 by a sound screen 7. The position of the sound receiver may be so located that the boat will naturally screen the direct sound from the receiver. The relative positions in which the sources of emitting and receiving sounds are located may be acoustically screened from one another by a variety of ways or may even operate without screening in some cases.

The sound emitter 4 may be energized by an electric source such as generator 8 through the leads 9, 10, and 11 which with the contact maker and breaker 12, which will be described later, form an electrically conducting circuit when the latter is in a closed position.

The receiving source 15 which is conventionally represented as a microphone is connected through the leads 13 and 14 in a series circuit represented by the battery 16 and the transformer winding 17 which has comparatively few turns, about 100. The secondary of the transformer 18 is represented by the winding 19 with a large number of turns of about 2500. The transformer 18 has an iron core as well as the transformers 20, 21, and 22 in the other parts of the receiving circuit. The parts of the receiving circuit A and B are tuned to the frequency of the incoming signals, A by condenser 23, and B by condenser 24, shunted around the secondary of transformers 18 and 20 respectively by the leads 25, 25'; 26, 26'; and 27, 27'; 28, 28'. Circuits A and B of the receiving apparatus serve as an amplifying means comprising the vacuum tubes 29 and 30 respectively with the usual three electrodes, of filament, grid, and plate as elements of the tubes. The initial section, circuit A has a slightly negative grid potential obtained by a battery 31, while both sections have a positive plate potential obtained through batteries 32 and 33. The output of the amplifying circuit A is connected by leads 34 and 35 to the primary of the transformer 20 which is an iron core transformer with a large number of turns for both primary and secondary windings. The secondary winding 36 serves as the input for the second amplifying circuit B which is similar to circuit A. The output of circuit B, which is effected through transformer 21, similar to transformer 20, transmits the energy, which it may receive, to the relay circuit C, which serves to energize the relay 37 upon the receipt of the returning signal. The circuit C is tuned by the condenser 39 connected across the secondary of the transformer 21 by means of the leads 38 and 40. The main feature of this circuit is that the grid of vacuum tube 41 has a high negative potential with respect to the filament of the tube. The circuit is otherwise similar to the circuits A and B. The relay 37 is in the output of circuit C, in the plate filament circuit, as shown by the leads 42 and 43. Normally the plate current which is the current through the relay winding is zero because of the high negative potential of the grid which prevents any current from flowing through the filament plate circuit. At times of signals, however, this negative potential upon the grid is overcome by the amplification of the potential of the signal which during half of the signal cycle neutralizes the grid potential, partially, or wholly, so that a current builds up rapidly in the plate filament circuit containing the relay. The relay operated through this sudden current impulse breaks the contact 44 by attracting the armature 45 in the series circuit containing the battery 46 and the primary winding 47 of an iron core transformer 22. As shown diagrammatically in Figure 1, this transformer is a step-up transformer so that the potential across the secondary winding 49 is of the order of 1000 volts or large enough to operate the visual signal shown at 63.

The visual signal, however, which it seems preferable to use is a gaseous tube in which the pressure is low, preferably at the critical point and which contains two electrodes connecting across the transformer 22 by means of the leads 51 and 52.

Figure 1A:
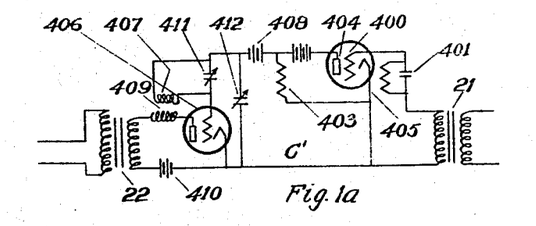

In the preferred embodiment this visual signal, giving a luminous red light by the action of the current glowing in the gas, is operated at about 1000 volts, by the induced current from the break of the relay circuit. However, the visual signal may be operated directly without a relay by the trigger action of the circuit C, which in reality is a relay without any mechanical moving parts as is common in the ordinary relay circuit. Figure 1ª shows a circuit which may be substituted for circuit C to effect a pure electrical operation of the visual signal. The secondary of transformer 21 runs on one side to a grid 400 of a vacuum tube through a grid condenser 401 of about .00002 mf. shunted by a grid leak of about two megohms. Besides this feature there is plate filament circuit of a high resistance 403 of about 20,000 ohms in series with a battery of about 50 volts so that the plate 404 is positive with respect to the filament 405. The grid of second tube 406 is connected to the plate 404 through a tickler coil 407 shunted by a tuning condenser 411 and a battery 408 in series, making the grid of the tube 406 negative in potential. The second tickler coil 409 is in the plate filament circuit of the tube 406 in series with the output transformer 22 and a battery 410 which makes the plate of tube 406 positive with respect to the filament. There is also a condenser 412 from the filament to the negative end of the battery 408, preventing oscillations from the second tube back upon the first.

The action of the first tube as shown is rectification, although it may be used simply as amplification in which latter case the visual signal would operate individually for each cycle of the signal. Thus, if the signal consisted of 10 cycles, it would operate ten times individually. In the present circuit the resistance 403 serves to change the potential difference of the grid of tube 406 with respect to the filament and plate at such times when the signal comes in, through the change of current through the resistance 403. Since this resistance is high a very small change of current will produce a large change of potential. The tube 406 is adjusted at such a point that this change of potential suddenly builds up a current through the primary of the transformer 22 sufficient to operate the visual signal.

Figure 5:
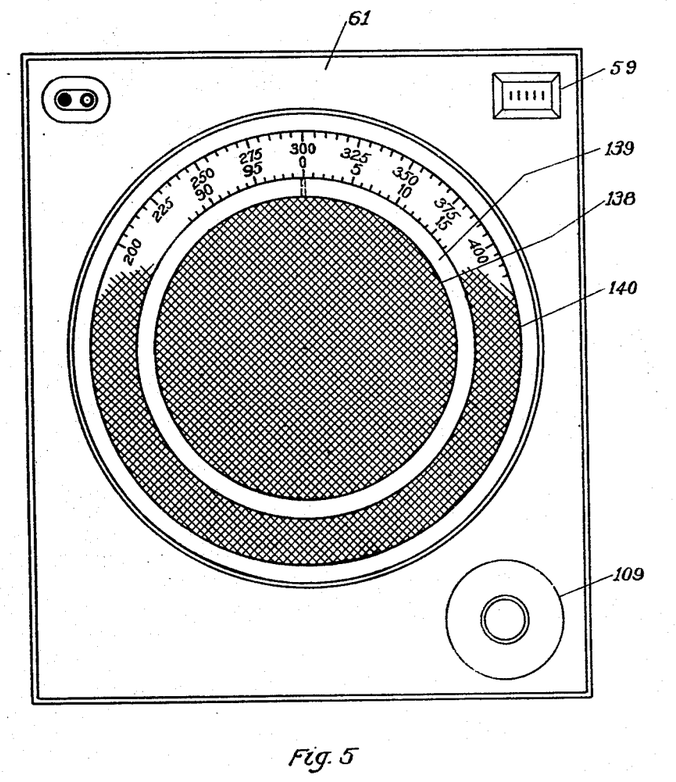
Figure 5 represents a front view of the part of the apparatus for indicating the measurement.

The operating mechanism for the visual signal is within the housing 60. Behind the panel 61 is a disc 62 which is preferably colored black. This disc carries near its periphery the gaseous tube 63 on the inner side with reference to the panel. In front of the tube 63 there is a slit in the disc at 64 through which the light of the tube 63 can pass. Two wires from opposite ends of the tube shown as 65 and 66 pass down to their two respective brush holders 67 and 68 which are insulated from each other. The brushes 67' and 68', associated with the leads 65 and 66 respectively, bear upon the rings 69 and 70 respectively mounted and insulated from each other upon the disc 71 which is fixed firmly upon the base or bearing 72 so that it is stationary at all times. The ring 69 has a lead 73 attached thereto extending up to the switch 74, while the ring 70 is connected to the contact maker and breaker 75 on the side of the disc 71, opposite to that of the rings just mentioned. The function of this contact is to break the circuit to the tube 63 at times when the signal source is being operated. This is accomplished by means of the cam 76 mounted rigidly upon the rotating shaft 77 which carries, as well as the cam 76, the disc 62, the cam 78, the gears 79 and 80. The contact 75 is shut at all times except when the spring 81 recedes from the upper half of the contact 82 as the surface of the cam drops away during a portion of its revolutions. At that point the dog 83, Figure 2, of the cam 78 closes the contact maker and breaker 12 energizing the sound source. The upper contact 82 connects directly to the lead 52. The lead 73 connects to the contact members 87 and 84 and then to the lead 51 through the switch blade 85 or 86 depending upon which direction the switch is set. It will be noted by this arrangement that the circuit is broken only in shifting the switch from one side to the other, but that on either side the circuit to the tube is completed.

The shaft 77 is supported by two bearings 72 and 88 which in turn are supported from the base of the casing 60 by supports 89 and 90. The shaft 77 carrying the members mentioned above may revolve in these bearings, driven by the motor 91 through the gear drive about to be explained. Integral with the motor shaft is a worm gear 92 meshing with the gear 93 which turns the shaft 94 and the gear 95 thereby furnishing power to drive the shaft 96 through the gear 97 which is rigidly connected thereto. The shaft 96 carries a sleeve 98 which has two different diameter gears at each end, a large gear 99 and a small one 100. This sleeve 98 revolves with the shaft 96 but may be moved along the shaft in a slot, not shown, so that 99 may mesh with gear 79, or 100 may mesh with 80, depending whether the sleeve 98 is at the left or right in Figure 1. The mechanism for shifting the sleeve 98 which changes the speed of the disc 62 is as follows. A shaft 101 movable longitudinally in the bearing 102 and 103 carries rigidly a forked piece 104 which fits into a groove 105 in the sleeve 98 but in no way attached thereto. The shaft 101 is slotted at one end and carries a pin 106 perpendicularly through the slot. The switch 74 carries the forked piece 107, the forked end of which fits about the pin 106 and serves as a free joint whereby, when the piece 107 is rotated through its usual angle in turning the switch handle 125 from one side to the other, the shaft 101 is moved in its longitudinal direction and the sleeve 98 is thereby shifted to change the speed of the disc.

When the piece 107 is in its vertical position the sleeve 98 meshes with neither 79 nor 80 and likewise the circuits going through the switch are open.

The motor 91 is supplied through a current supply E in this case of 110 volts. One line 108 of the supply goes directly to the motor and connects also to the potentiometer 109, while the other line 110 of the supply goes to the switch 74 at contacts 111 and 112, and return through the blade 113 and line 114 to the end of the potentiometer 109 opposite to that where line 108 is connected. The movable connection of the potentiometer 109 leads to the wire 115 which is connected to the motor armature terminals. Thus by rotation of the potentiometer arm, and change of the place of connection for the wire 115, the voltage across the motor may be changed and the speed regulated. Besides this voltage regulation of the motor, there may also be the usual rheostat regulation upon the motor field whereby very fine adjustments of the speed of the motor may be obtained.

When the piece 107 is in its vertical position as when there is a shift being made from one speed to another the motor circuit would be opened but for the resistance 116 which then comes in series with the motor armature, thus decreasing the speed of the motor but not shutting the power to the motor off entirely.

Figures 3, 4:
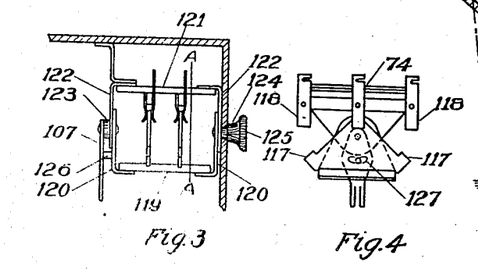
Figures 3 and 4 represent the details of the switch mechanism and speed changing mechanism.

The switch 74 is shown in actual construction in Figures 3 and 4 and consists of knife blade arms 117 fitting into the spring forks 118. The blades are rigidly mounted on a base 119 which carries brackets 120, 120, and the spring forks 118 are likewise mounted upon a similar base 121 carrying similar brackets 122, 122. The members are held together by the pins 123 and 124 so that by turning the handle 125, the switch may be closed to the right or left according to the direction of movement. Carried on the pin 123 is the piece 107 but free from the former when the pin is rotated by movement of the handle 125. The piece 107 is carried from the right to the left or vice versa by the pin 126 moving in the slot 127. When the handle is turned the pin is carried in the same direction and coming to the end of the slot 127 begins to carry the piece 107 with it.

Figure 2:
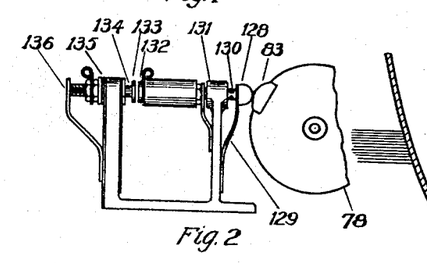
Figure 2 represents a detail of the electric contact mechanism for the operation of the sound source.

The mechanism for closing the energy source to the signal is effected through the cam 78 and the dog 83, as shown in detail in Figure 2. The cam in its revolution strikes the head 128 mounted upon a spring 129, and carrying a plunger 130 acting longitudinally through the bearing 131, moves the contact face 132 into electrical connection with the face 133 which is supported by the plunger 134 moving in a similar bearing 135 and backed by a similar spring 136 as in the opposite end of the contact mechanism.

The face of the housing 60 contains the panel 64 having mounted thereon a push button in the upper left hand corner to throw the power supply E upon the apparatus. In the right hand corner is a frequency meter 59 which is connected across armature of the motor 91 by slip rings 57 and 58 so that the frequency of the motor and thereby its speed may be known.

The center of the panel contains a circular glass plate having an opaque center 138, a clear concentric ring 139 the same radial width as the slit 64 in the disc 62 and a second opaque ring 140 extending about the entire ring upon which is painted or marked in some way a suitable scale for measuring the desired time interval in the desired units. There may be two scales as shown upon this ring or more, according to the interval to be measured and according to the speed of rotation of the disc 62.

In the lower right hand corner of the panel is potentiometer 109 which has been described above.

The operation of the apparatus readily follows from the description given above. The push button on the panel closes the circuit to the power source E. The switch 74 should be in a closed position and then the potentiometer 109 is turned until the motor 91 has the desired speed as noted by the frequency meter. Disc 62 will then rotate at a definite velocity faster or slower according to the position of the gear 98 and thus carry the tube 63 and slit 64 about the ring 139 at a constant velocity. Since the disc is black and there is no light behind it, an observer cannot tell that the disc is moving and likewise he will not see the slot. The amplifying and receiving circuits are then properly adjusted, which can be effected by adjustment of the plate voltages, grid potentials and filament currents. The condensers when once adjusted for a particular operation need not be further adjusted.

In depth sounding as an example of the use of the apparatus described above, the generator 8 is operated by a proper source, not shown, which impresses energy across the terminals of the electrical sound source 4. as the dog 83, upon the disc 78, closes the contact 12. The impulse created travels to the reflecting bottom, returns, and is received by the receiver 15. This received impulse acts through the amplifying circuits A, B, and C operating the relay or trigger circuit as the case may be and impresses a high voltage across the tube 63, which thereby discharges in a luminous exceedingly short flash, so short in fact that the rotation of the disc at the more rapid speed will not appreciably widen the light as compared with the slower speed obtained by shifting the sleeve 98. Between the emission of the initial signal and the return of the echo, which interval is the time it takes for the signal to travel to the ocean bottom and return, the tube 63 upon the disc 62 has advanced at a uniform speed through a distance which is the measure of depth to be measured.

If for some reason it is desirable to have a longer flash as for instance to indicate the duration of a signal or a short time interval, this can easily be accomplished by having the trigger circuit mentioned above oscillate during the time of the signal in which case a light band can be made. However, the band will commence sharply and cease abruptly since the flash responds so rapidly to the discharge as to be simultaneous with it.

During the interval in which the sound source is emitted the contact 75 is open and no flash will show on the dial face although the slit will then be at its zero position by the proper location of the dog 83. When the echo has returned the disc will have rotated a certain amount depending upon the time which the sound required to travel to the bottom and be reflected back to the receiver again. When the sound is received it acts through the receiving and amplifying circuits, and operates the luminous light which may flash for instance when the slit is at a position 10. Thus a bright mark will indicate 10 which will be the measure of the time interval and also the depth.

It is not necessary to have the receiving circuit cut out at the time the signal is emitted. As shown in Figure 1, the receiver 15 may receive the direct signal even though there is screening between the receiver and sender since a slight amount of energy of the direct signal can be allowed to come through to the receiver. If the contact 75 is made permanent the indicating circuit is working at all times and first the direct signal can be indicated and then the returning echo.

The use of the apparatus for other purposes which have been mentioned is obvious from the description of the apparatus. Since sound, in traveling from one kind of a sound medium to another, always has part of its energy reflected backwards again, it is evident that the reflection may be utilized in the manner described above to ascertain a great variety of information all, however, depending upon the time of travel of the sound in the conducting medium. If the sound velocity is known the distance may be determined and if the distance is known the character of the transmitting medium may be obtained.

For operation purely as an apparatus for measurement of time intervals, it is only necessary to have a signal given at the beginning of the time interval and at the end. This latter signal may be such as to cause a flash of the visual signal at such times or it may be such as to stop a continuous flash which began with the first signal. This can be easily accomplished by use of the trigger circuit C, described above with the first tube operating upon a different portion of the characteristic curve from that above. The space as shown on the dial before the disc, either between the flashes of the signal or where the light band commences and ceases, is the measure of the interval.

The operation can be made continuous in the case of depth sounding; that is, for each revolution of the cam operating the signal, a return echo can be indicated and thus as a ship is under way a continuous indication of the depth of water below the ship may be obtained. In a similar way any instrument which has a periodical indication can indicate the time interval between these indications by operation of the visual signal as above described. Similarly changing time intervals can be detected in this manner by the increase or decrease of the relative space between the operations of the signal as noted on the fixed scale.

Thus if a given signal which is made at a certain known time and repeated periodically at certain known intervals as for instance equal intervals and a second signal which repeats periodically at approximately the same time intervals but changing, are made to indicate visually, the gradual change of the second signal with respect to the first can be noted by the shifting apart of the two signals.

Having now described my invention I claim:

1. An apparatus for measuring distance and depths, comprising means for producing a compressional wave impulse, means for receiving the impulse produced after reflection from the object whose distance is to be measured and means for measuring the time interval between the production of the impulse and its reception, including an indicator, a scale calibrated in desired units of measurement, means for moving said indicator across said scale and means including said indicator and responsive to said impulse receiving means for producing a momentary line of light on said scale during the movement of said indicator across the latter.

2. An apparatus for measuring distance and depths, comprising means for producing a compressional wave impulse, means for receiving the impulse produced after reflection from the object whose distance is to be measured and means for measuring the time interval between the production of the impulse and its reception, including a discharge indicator, a scale calibrated in desired units of measurement, means for moving said discharge indicator across said scale and means including said discharge indicator and responsive to said impulse receiving means for producing a momentary line of light on said scale during the movement of said discharge indicator across the latter.

3. An apparatus for measuring distance and depths, comprising means for producing a train of compressional waves, means for receiving said waves after reflection from the object whose distance is to be measured and means for measuring the time interval between the production of the waves and their reception, including an indicator, a scale calibrated in desired units of measurement, means for moving said indicator across said scale and means including said indicator and responsive to said wave receiving means for producing a momentary line of light on said scale during the movement of said indicator across the latter.

4. An apparatus for measuring distance and depths, comprising means for producing a compressional wave signal indicating the beginning of the time interval to be measured, means for receiving the signal after reflection from the surface whose distance is to be measured and means for measuring the time interval between the production of the signal and its reception, comprising a scale calibrated in desired units of measurement, an indicator, normally inoperative, means for moving said indicator at such a rate that its position with reference to the scale indicates the desired measurement on said scale, and means including said indicator and responsive to said wave receiving means for producing a momentary line of light on said scale during the movement of said indicator across the latter, indicating the measurement.

5. An apparatus for measuring distance and depths, comprising means for producing a compressional wave signal indicating the beginning of the time interval to be measured, means for receiving the signal after reflection from the surface whose distance is to be measured and means for measuring the time interval between the production of the signal and its reception, comprising a scale calibrated in desired units of measurement, a discharge indicator, normally inoperative, means for moving said indicator at such a rate that its position with reference to the scale indicates the desired measurement on said scale and means including said discharge indicator and responsive to said wave receiving means for producing a momentary luminous discharge of said indicator indicating the desired measurement on said scale.

6. An apparatus for measuring distance and depths, comprising means for producing a compressional wave signal indicating the beginning of the time interval to be measured, means for receiving the signal after reflection from the surface whose distance is to be measured and means for measuring the time interval between the production of the signal and its reception, comprising a scale calibrated in desired units of measurement, an indicator, normally inoperative, means for rotating said indicator at such a rate that its position with reference to the scale indicates the desired measurement on said scale and means including said discharge indicator and responsive to said wave receiving means for producing a momentary luminous discharge of said indicator indicating the desired measurement on said scale.

7. An apparatus for measuring distance and depths, comprising means for producing a compressional wave signal indicating the beginning of the time interval to be measured, means for receiving the signal after reflection from the surface whose distance is to be measured and means for measuring the time interval between the production of the signal and its reception, comprising a scale calibrated in desired units of measurement, an indicator, normally inoperative, means for moving said indicator at such a rate that its position with reference to the scale indicates the desired measurement on said scale and means including said indicator and responsive to said wave receiving means for producing a momentary luminous discharge of said indicator, indicating the desired measurement on said scale.

8. An apparatus for measuring distance and depths, comprising means for producing a compressional wave signal indicating the beginning of the time interval to be measured, means for receiving the signal after reflection from the surface whose distance is to be measured and means for measuring the time interval between the production of the signal and its reception, comprising a scale calibrated in desired units of measurement, an indicator, normally inoperative, means for moving said indicator at such a rate that its position with reference to the scale indicates the desired measurement on said scale, relay means responsive to said wave receiving means and means including said indicator operated by said relay means for producing a momentary luminous discharge of said indicator, indicating the desired measurement on said scale.

9. An apparatus for measuring distance and depths, comprising means for producing a compressional wave signal indicating the beginning of the time interval to be measured, means for receiving the signal after reflection from the surface whose distance is to be measured and means for measuring the time interval between the production of the signal and its reception, comprising a scale calibrated in desired units of measurement, an indicator, normally inoperative, means for moving said indicator at such a rate that its position with reference to the scale indicates the desired measurement on said scale, means including an electric operating relay responsive to said wave receiving means and means including said indicator operated by said relay for producing a momentary luminous discharge of said indicator, indicating the desired measurement on said scale.

10. An apparatus for measuring distance and depths, comprising means for producing a compressional wave signal indicating the beginning of the time interval to be measured, means for receiving the signal after reflection from the surface whose distance is to be measured and means for measuring the time interval between the production of the signal and its reception, comprising a scale calibrated in desired units of measurement, an indicator, normally inoperative, means for moving said indicator at such a rate that its position with reference to the scale indicates the desired measurement on said scale, an amplifying circuit responsive to said wave receiving means, a relay operated by said amplifying circuit, and means comprising said indicator and a transformer responsive to said relay and operating said indicator for producing a momentary luminous discharge of said indicator, indicating the desired measurement on said scale.

11. An apparatus for measuring distance and depths, comprising means for producing sound waves, means for receiving the sound waves produced after reflection from the object whose distance is to be measured and means for measuring the time interval between the production of the sound wave and its reception, including an indicator, a scale calibrated in the desired units of measurement, means for moving said indicator across said scale and means including the indicator for producing during the movement of said indicator across said scale a line of light indicating the measurement.

12. An apparatus for measuring distance and depths, comprising means for producing sound waves, means for receiving the sound waves produced after reflection from the object whose distance is to be measured and means for measuring the time interval between the production of the sound wave and its reception, comprising a dial graduated in the desired units of measurement having a transparent ring, means responsive to said sound receiving means for producing a line of light on said scale and means for rotating said last means at a constant speed whereby the position of the illumination will indicate the measurement.

13. In an apparatus for distance and depth measurement, a scale, a discharge indicator moving across said scale and means including said indicator for producing by a momentary operation of said indicator, a momentary local illumination indicating on said scale the desired measurement, comprising sound responsive means and means operated by said sound responsive means to operate said indicator.

14. In an apparatus for distance and depth measurement, a scale graduated in desired units, an indicator moving relative to the scale and means including the indicator for producing a line of light adjacent to the scale.

15. In an apparatus for distance and depth measurement, a dial graduated in desired units having an opaque surface but for an annulus having transparency, a disc positioned to revolve closely behind said dial, said disc being uniform in color and having a slit positioned behind the annulus, means for producing a momentary illumination of light through the slit whereby the production of said momentary illumination will furnish an indication on the dial.

16. In an apparatus for distance and depth measurement, a dial graduated in desired units having an opaque surface but for an annulus having transparency, rotating means positioned behind said dial, and luminous discharge means associated with said rotating means positioned behind the transparent annulus for producing a line of light on said dial indicating the desired measurement.

17. In an apparatus for distance and depth measurement, a scale, a discharge indicator moving across said scale and means including said indicator for producing by a momentary operation of said indicator a momentary local illumination indicating on said scale the desired measurement comprising sound responsive means, a relay operated by said last means and means operated by said relay to operate said indicator.

18. In an apparatus for distance and depth measurement, a scale, a discharge indicator moving across said scale and means including said indicator for producing by a momentary operation of said indicator a local illumination of the scale indicating on said scale the desired measurement comprising sound responsive means, a relay having its winding connected to the sound responsive means, a transformer having its primary winding closed by the armature of the relay and its secondary connected to said indicator.

19. An apparatus for measuring distance and depths, comprising a scale calibrated in desired units of measurement, indicating means moving across said scale, means for producing a compressional wave signal when said indicating means is at the zero position of said scale, means for receiving the signal after it has been reflected from the surface whose distance is to be measured and means including said indicating means for producing a momentary line of light on the scale for indicating the desired measurement.

20. An apparatus for measuring distance and depths, comprising a scale calibrated in desired units of measurement, a discharge indicator moving across said scale, means for producing a compressional wave signal when said discharge indicator is at the zero position of said scale, means for receiving the signal after it has been reflected from the surface whose distance is to be measured and means including said discharge indicator for producing by a momentary operation of said discharge indicator a momentary local illumination indicating the desired measurement.

21. An apparatus for measuring distance and depths, comprising a scale calibrated in desired units of measurment, a discharge indicator moving across said scale, a cam moving in synchronism with said discharge indicator, a contact mechanism operated by said cam and means operated by said contact mechanism for producing a compressional wave signal, means for receiving the signal after it has been reflected from the surface whose distance is to be measured and means including said discharge indicator for producing a momentary line of light on the scale for indicating the desired measurement.

22. A method of distance measurement comprising periodically sending a signal synchronized with a zero position of a moving discharge indicator on a scale, receiving the returning signal, related to the signal which was sent, from the object whose distance is to be measured, causing said returning signal so received to operate said indicator and produce by a momentary local illumination a line of light on the scale whereby the position of said visible indication with reference to the zero position will determine the distance to be measured.

23. A method of distance measurement with the aid of an indicator moving relative to a scale, comprising sending a signal at a time when the indicator is in a zero position, receiving the returning signal related to the signal which was sent from the object whose distance is to be measured, causing said indicator to move relative to the measuring scale and producing by a momentary local illumination of said indicator a line of light on said scale whereby an indication of the measurement will be given.

24. In an apparatus for distance and depth measurement, a dial graduated in desired units of measurement, indicating means cooperating with said dial and including electrodes forming a discharge gap and means for rotating at least one of said gap electrodes with respect to said dial and means, including means responsive to sound vibrations for causing a momentary discharge across said gap for producing a visible indication adjacent said scale, having a width of the same order of magnitude as that of the graduation lines of said scale.

25. In an apparatus for distance and depth measurement, a dial graduated in desired units of measurement, indicating means cooperating with said dial and including electrodes forming a discharge gap and means for rotating at least one of said gap electrodes with respect to said dial, means for producing a compressional wave signal when at least one of said gap electrodes has reached a chosen point with reference to the dial and means, including means responsive to sound vibrations for causing a momentary discharge across said gap for producing a visible indication adjacent said scale, having a width of the same order of magnitude as that of the graduation lines of said scale.

26. In an apparatus for distance and depth measurement, a dial graduated in desired units of measurement, indicating means cooperating with said dial and including electrodes forming a discharge gap and means for rotating at least one of said gap electrodes with respect to said dial, means for producing a compressional wave signal when at least one of said gap electrodes has reached a zero point with reference to the dial and means, including means responsive to sound vibrations for causing a momentary discharge across said gap for producing a visible indication adjacent said scale, having a width of the same order of magnitude as that of the graduation lines of said scale.

27. In an apparatus for distance and depth measurement, a dial graduated in desired units of measurement, an indicator rotating coaxially with the line perpendicular to the center of the dial, means for producing a compressional wave signal when the indicator has reached a chosen point with reference to the dial and means including means responsive to sound vibrations for producing a luminous line of light indicating the desired measurement on the dial.

28. In an apparatus for measuring distance and depths, means for receiving a compressional wave signal, a scale and means for indicating the reception of the compressional wave with reference to the scale including an indicator including a discharge gap constantly moving with reference to the scale, a relay having its winding connected to said receiver and a transformer having its primary winding normally closed by the armature of said relay and having its secondary connected to said discharge gap to produce upon the operation of said relay by a momentary illumination of said indicator a momentary local illumination of said scale indicating the desired measurement.

29. In an apparatus for measuring distance and depths, means for receiving a compressional wave signal, a scale and means for indicating the reception of the compressional wave with reference to the scale including a gaseous lamp constantly moving with reference to the scale, a relay having its winding connected to said receiver and a transformer having its primary winding normally closed by the armature of said relay and having its secondary connected to said gaseous lamp to produce upon the operation of said relay by a momentary illumination of said lamp a momentary local illumination of said scale indicating the desired measurement.

30. In an apparatus for distance and depth measurement, a scale graduated in desired units, an indicator moving relative to the scale, means for receiving a signal and means including the indicator and means responsive to said signal receiving means for producing a line of light on said scale indicating the desired measurement.

31. In an apparatus for distance and depth measurement, a scale graduated in desired units, a discharge indicator moving relative to the scale and means including said discharge indicator for producing a line of light on the scale indicating the desired measurement.

32. In an apparatus for distance and depth measurement, means for receiving compressional waves, means for translating substantially instantaneously said compressional waves to electric vibrations, a scale and an indicator moving with reference to said scale and means including an electric relay for producing through said electric vibrations by an instantanous illumination of said indicator a line of light on said scale.

33. In an apparatus for distance and depth measurement, means for receiving compressional waves, means for translating substantially instantaneously said compressional waves to electric vibrations, a scale and an indicator moving with reference to said scale and means including an electric relay for producing through said electric vibrations by an instantaneous discharge through said indicator a line of light on said scale.

In testimony whereof I affix my signature.

HERBERT GROVE DORSEY.